Jan. 24, 1967  A. J. WILLIAMS  3,299,902
FLUID CONTROL VALVES
Filed Oct. 11, 1963
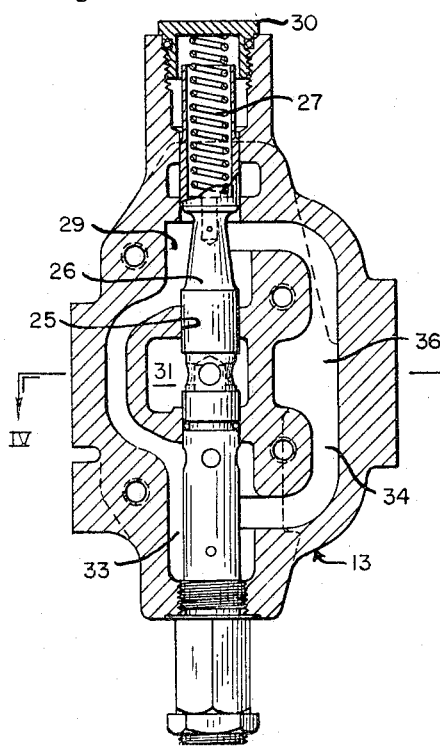
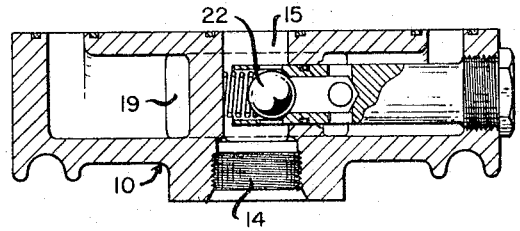
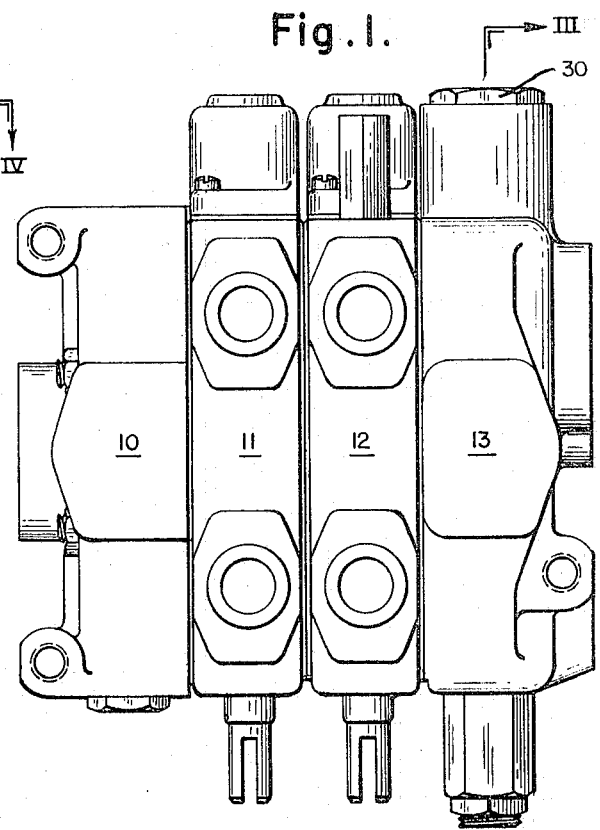
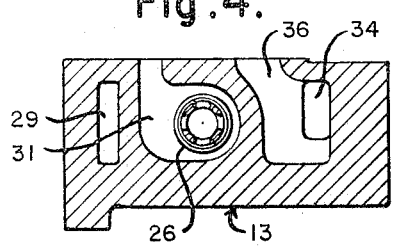
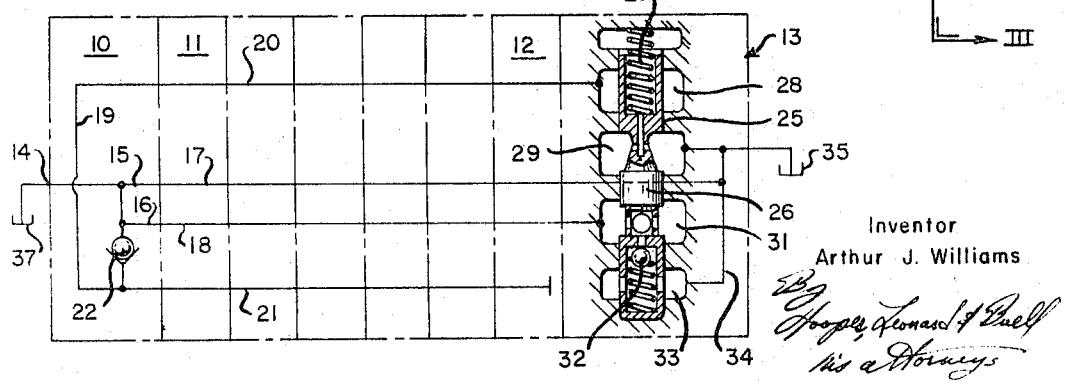
Inventor
Arthur J. Williams

United States Patent Office 3,299,902
Patented Jan. 24, 1967

3,299,902
FLUID CONTROL VALVES
Arthur J. Williams, Hubbard, Ohio, assignor to Commercial Shearing & Stamping Company, a corporation of Ohio
Filed Oct. 11, 1963, Ser. No. 315,499
5 Claims. (Cl. 137—117)

This invention relates to fluid control valves and particularly to a regenerative inlet and outlet section for use in connection with parallel circuit type valves such as type A-20 and A-35 valves manufactured by Commercial Shearing and Stamping Co. There are many occasions in the operation of double acting hydraulic cylinders such as are used on backhoes, high lifts and similar earth-moving equipment when the movement of the load on the machine is such that it tends to move faster than the flow of fluid from the source of power can accommodate. In such instances the side of the cylinder which is filling tends to cavitate and run ahead of the fluid supply. When this occurs, the operator loses the precise control over the machine which is desirable if not in fact necessary in earth-moving equipment. In order to avoid this effect, special valves have been built for use in those installations where cavitation is likely to occur. This alternative is expensive and places serious limitations on the types and sizes of valves that are available.

In the present invention I provide valve inlet and outlet sections adapted to be combined with conventional valves and to take advantage of their versatility, low cost and general availability as compared with special anti-cavitation valves.

Preferably I provide an outlet section comprising a housing, a bore in said housing, a valve element slidable in said bore, resilient means normally biasing the valve toward one end of said bore, a first chamber adjacent the resilient means intersecting the bore and adapted to communicate with the exhaust outlets of a preceding valve or valves, an outlet chamber intersecting the bore and connected to an exhaust port at the exterior of the housing, said chamber communicating through the bore with the first chamber when the valve element is moved against the resilient biasing means, a high pressure chamber receiving fluid from the inlet ports of the valve assembly through the preceding valves and subject to the input pressure and an inlet section comprising in inlet bore communicating with the two fluid inlets of the following conventional parallel valves, a cross-over bore connecting the two exhaust bores of the following conventional parallel valves and a bore connecting the inlet bore and crossover bore through a normally closed check valve adapted to open when the pressure in the cross-over exceeds that in the inlet bore. Preferably the inlet and outlet sections are so arranged that a pressure drop in the inlet bore such as occurs when a lowering cylinder runs ahead of the feed, the fluid in the exhaust cross-over passes through the check valve and joins the input fluid going to the lowering cylinder.

In the foregoing general description I have set out certain problems of the prior art and the purposes, objects and advantages of my invention. Other objects, advantages and purposes will be apparent from the following description and the accompanying drawings in which FIGURE 1 is a top plan of a valve assembly incorporating the regenerative inlet and outlet sections of my invention;

FIGURE 2 is a horizontal section through the inlet section of my invention as used in FIGURE 1;

FIGURE 3 is a vertical section on line III—III of FIGURE 1;

FIGURE 4 is a section on the line IV—IV of FIGURE 3; and

FIGURE 5 is a schematic illustration of the through flow of a valve assembly such as that of FIGURE 1.

Referring to the drawings I have illustrated in FIGURE 1 an inlet section 10, conventional parallel circuit valves 11 and 12 such as the A-20 type valve made by Commercial Shearing and Stamping Co. of Youngstown, Ohio, and a regenerative outlet section 13.

The inlet section 10 is shown schematically in FIGURE 5 and in horizontal section in FIGURE 2. The inlet section 10 is provided with an inlet port 14, a central input passage 15 connecting to the central input 16 of valves 11 and 12 and a parallel input passage 17 branching from input passage 15 and connecting with the parallel passages 18 of valves 11 and 12. A cross-over passage 19 connects the exhaust passages 20 and 21 of valves 11 and 12 and is connected by check valve 22 to input passage 15.

The outlet section 13 is provided with a bore 25 carrying a valve element 26 slidable therein. Spring means 27 biases the valve element 26 downwardly viewing FIGURES 3 and 5. A chamber 28 adjacent the spring intersects bore 25 and communicates with the exhaust passages 20 of valves 11 and 12, a discharge or exhaust passage 29 intersects the bore 25 adjacent chamber 28 and communicates through bore 25 with chamber 28 when the valve element 26 is shifted to overcome the biasing effect of spring 27. This biasing effect may be varied by adjusting the spring 27 in conventional manner by adjusting cap 30. Chamber 31 intersects the bore 25 adjacent chamber 29 and is in continuous connection with the parallel passages 18 of valves 11 and 12. A relief valve 32 is provided within valve element 26 to relieve the pressure within the valve into chamber 33 which connects with chamber 29 by cross-over passage 34 to discharge to reservoir 35. The outlet section blocks the end of exhaust passage 21 of valves 11 and 12. Center passages 17 by-pass bore 25 by means of passage 36 to passage 34.

The operation of the regenerative system of this invention is as follows. Pressure fluid from source 37 is delivered to inlet port 14 of inlet section 10 where it is divided by passages 15 and 16 into center passages 17 and parallel passages 18 of valves 11 and 12. The fluid in passage 17 passes directly through valves 11 and 12 and passage 36 to passage 34 and discharges into reservoir 35 so long as valves 11 and 12 are in neutral position. When one of the valves 11 or 12 is moved to actuate a lift cylinder, fluid is blocked at the center passage 17 of that valve, however, fluid continues to flow through passage 18 to chamber 31. This fluid urges valve element 26 against spring 27 and opens bore 25 between chambers 28 and 29. This permits discharged fluid from the lift cylinder to exhaust through passages 21, 20 and 19 through chamber 28, bore 25, chamber 29 and into reservoir 35. If the valves 11 or 12 are actuated to lower a loaded bucket so that the lift cylinder exhausts to passages 21, 20 and 19 so rapidly as to drop the pressure in parallel passage 18, the valve element is moved by spring 27 to close bore 25 between chambers 28 and 29. This forces fluid in passages 21, 20 and 19 to be diverted through check valve 22 into parallel passage 18 to supplement the input fluid and prevent cavitation in the cylinder.

While I have disclosed a presently preferred embodiment of my invention in the foregoing specification and the accompanying drawings, it will be understood that this invention may be otherwise embodied within the scope of the following claims.

I claim:
1. In a circuit of fluid control valves having a pair of parallel fluid inlet passages and a fluid exhaust passage the improvement comprising an inlet section comprising an inlet port continuously connecting the parallel inlet pas- sages to a source of pressure fluid and check valve means connecting the exhaust passage to the two fluid inlet passages and adapted to permit flow from the exhaust passage to the inlet passages when the pressure in the exhaust exceeds that in the inlet passages and an outlet section comprising a housing, a bore in said housing, a valve element slidable in said bore, resilient means normally biasing the valve toward one end of said bore, a first chamber adjacent the resilient means intersecting the bore and communicating with the exhaust passage of the fluid control valves, an outlet chamber intersecting the bore and connected to an exhaust port at the exterior of the housing, said chamber communicating through the bore with the first chamber when the valve element is moved against the resilient biasing means, and a high pressure chamber receiving fluid from the parallel fluid passages of preceding valves, whereby the valve element is moved to overcome the biasing effect of the resilient means when the pressure of inlet fluid is at a preselected level permitting exhaust fluid to flow through the first chamber, the bore and the outlet chamber to be discharged from the valve and when the pressure is below the preselected level causing valve element to close the bore and force the exhaust fluid through the inlet section check to supplement the input fluid.

2. In a circuit of fluid control valves having a pair of parallel fluid inlet passages and a pair of fluid exhaust passages the improvement comprising an inlet section comprising an inlet port continuously connecting the parallel inlet passages to a source of pressure fluid, a cross-over passage connecting the exhaust passages and check valve means connecting the exhaust passages to the two fluid inlet passages and adapted to permit flow from the exhaust passage to the inlet passages when the pressure in the exhaust exceeds that in the inlet passages and an outlet section comprising a housing, a bore in said housing, a valve element slidable in said bore, resilient means normally biasing the valve toward one end of said bore, a first chamber adjacent the resilient means intersecting the bore and communicating with the exhaust passage of the fluid control valves, an outlet chamber intersecting the bore and connected to an exhaust port at the exterior of the housing, said chamber communicating through the bore with the first chamber when the valve element is moved against the resilient biasing means, and a high pressure chamber receiving fluid from one of said parallel fluid inlet passages, whereby the valve element is moved to overcome the biasing effect of the resilient means when the pressure of inlet fluid is at a preselected level permitting exhaust fluid to flow through the first chamber, the bore and the outlet chamber to be discharged from the valve and when the pressure is below the preselected level causing valve element to close the bore and force the exhaust fluid through the inlet section check to supplement the input fluid.

3. In a circuit of fluid control valves having a pair of parallel fluid inlet passages and a fluid exhaust passage and an inlet section continuously connecting the parallel inlet passages to a source of pressure fluid and having check valve means connecting the exhaust passage to the two fluid inlet passages, the improvement comprising an outlet section comprising a housing, a bore in said housing, a valve element slidable in said bore, resilient means normally biasing the valve toward one end of said bore, a first chamber adjacent the resilient means intersecting the bore and communicating with the exhaust passage of the fluid control valves, an outlet chamber intersecting the bore and connected to an exhaust port at the exterior of the housing, said chamber communicating through the bore with the first chamber when the valve element is moved against the resilient biasing means, and a high pressure chamber receiving fluid from one of said parallel fluid inlet passages, whereby the valve element is moved to overcome the biasing effect of the resilient means when the pressure of inlet fluid is at a preselected level permitting exhaust fluid to flow through the first chamber, the bore and the outlet chamber to be discharged from the valve and when the pressure is below the preselected level causing valve element to close the bore and force the exhaust fluid through the inlet section check to supplement the input fluid.

4. An outlet section as claimed in claim 3 wherein the valve element is hollow at the end remote from the resilient means and carries a relief check communicating through the hollow end between the high pressure chamber and the outlet chamber.

5. An outlet section as claimed in claim 3 wherein the resilient means is a spring having adjustment means whereby the pressure applied to the valve element is varied.

References Cited by the Examiner

UNITED STATES PATENTS 3,194,265   7/1965   Tennis _____ 137—596

WILLIAM F. O'DEA, *Primary Examiner.*

H. COHN, *Assistant Examiner.*